(12) United States Patent
Kang et al.

(10) Patent No.: US 9,870,711 B2
(45) Date of Patent: Jan. 16, 2018

(54) SYSTEM AND METHOD FOR DETERMINING AN ALTERNATIVE FLIGHT ROUTE BASED ON SECTOR GEOMETRY

(71) Applicant: The Boeing Company, Chicago, IL (US)

(72) Inventors: Laura S. Kang, Seattle, WA (US); Darryn R. Frafford, Seattle, WA (US); Michael L. Carter, Sammamish, WA (US); Matthew E. Berge, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 14/733,550

(22) Filed: Jun. 8, 2015

(65) Prior Publication Data
US 2016/0358480 A1 Dec. 8, 2016

(51) Int. Cl.
*G08B 5/00* (2006.01)
*G08G 5/00* (2006.01)
*G01C 21/00* (2006.01)

(52) U.S. Cl.
CPC ........... *G08G 5/0039* (2013.01); *G01C 21/00* (2013.01); *G08G 5/0026* (2013.01)

(58) Field of Classification Search
CPC ... G08G 5/0043; G08G 5/0034; G08G 5/0013
See application file for complete search history.

(56) References Cited

U.S. PATENT DOCUMENTS

| 2008/0059058 A1* | 3/2008 | Caillaud | G05D 1/0202 701/467 |
| 2009/0125221 A1* | 5/2009 | Estkowski | G05D 1/104 701/120 |

(Continued)

FOREIGN PATENT DOCUMENTS

| EP | 2 031 350 | 3/2009 |
| JP | 2014 016264 | 1/2014 |

(Continued)

OTHER PUBLICATIONS

Grabbe, S. et al.; "Sequential Traffic Flow Optimization with Tactical Flight Control Heuristics"; Journal of Guidance, Control and Dynamics, vol. 32, No. 3; pp. 810-820 (May-Jun. 2009).

(Continued)

*Primary Examiner* — Redhwan K Mawari
*Assistant Examiner* — Rodney P King
(74) *Attorney, Agent, or Firm* — Thompson Hine LLP

(57) ABSTRACT

A flight routing system for determining an alternative route for an aircraft based on an airspace partitioned into a plurality of sectors, and an original flight route having an initial point of takeoff and a destination point is disclosed. The flight routing system includes a processor and a memory storing instructions executable by the processor to perform operations including determining a plurality of points within each of the plurality of sectors. The plurality of points are each located along an edge of one of the plurality of sectors. The processor also performs operations including determining at least one connecting arc for each sector, where the connecting arc connects a first point with another point within each sector. The processor further performs operations for determining a complete time-based airspace network based on at least a forecast capacity.

16 Claims, 10 Drawing Sheets

(56) References Cited

U.S. PATENT DOCUMENTS

| | | | | |
|---|---|---|---|---|
| 2011/0291879 | A1* | 12/2011 | Mandle | G01P 5/26 |
| | | | | 342/26 R |
| 2012/0083946 | A1* | 4/2012 | Maldonado | G06Q 10/06 |
| | | | | 701/3 |
| 2012/0083997 | A1* | 4/2012 | Meador | G08G 5/0013 |
| | | | | 701/120 |
| 2013/0304300 | A1* | 11/2013 | Peake | B62D 15/025 |
| | | | | 701/23 |

FOREIGN PATENT DOCUMENTS

| | | |
|---|---|---|
| WO | 99/17080 | 4/1999 |
| WO | 00/40929 | 7/2000 |
| WO | 03/025507 | 3/2003 |

OTHER PUBLICATIONS

Chen, Y. et al.; "Dynamic Airspace Sectorization Via Improved Genetic Algorithm"; Journal of Mod. Transport 21(2); pp. 117-124 (Jun. 7, 2013).

Wang, L. et al.; "Rerouting Strategy Research Based on Improved Ant Colony Algorithm"; IEEE 8th Conference on Industrial Electronics and Applications; pp. 766-770 (Jun. 19-21, 2013).

Kuo, V.; "Flight Plan Optimization in a Dynamic Airspace Environment"; 52nd Annual Conference of the Air Traffic Control Association; pp. 85-95 (Oct. 28-31, 2007).

Sherali, Hanif D. et al.; "Configuration of Airspace Sectors for Balancing Air Traffic Controller Workload"; Springer; Grado Department of Industrial and Systems Engineering, Blacksburg, VA; pp. 1-31 (Jan. 20, 2011).

Wang, Tong et al.; "Dynamic Reconfiguration for En-Route Airspace"; Journal of Beijing Institute of Technology, 2011, vol. 20, No. 4; pp. 445-450 (Oct. 25, 2010).

Kulkarni, Sameer et al.; "Static Sectorization Approach to Dynamic Airspace Configuration Using Approximate Dynamic Programming"; Integrated Communication, Navigation and Surveillance Conference (ICNS); pp. J2-1-J2-9 (May 10-12, 2011).

McNally, David et al.; "Dynamic Weather Routes: A Weather Avoidance Concept for Trajectory-Based Operations"; ICAS 2012; 28th International Congress of the Aeronautical Sciences; pp. 1-18 (Sep. 23-28, 2012).

Tong Wang, Jinhua Li et al.; "A Sectorization Method for Dynamic Airspace Configuration"; AIAA Guidance, Navigation, and Control Conference; Toronto, Ontario, CA; pp. 1-13 (Aug. 2-5, 2010).

Kicinger, Rafal et al.; "Heuristic Method for 3D Airspace Partitioning: Genetic Algorithm and Agent-Based Approach"; American Institute of Aeronautics and Astronautics; pp. 1-15 (Sep. 17, 2009).

Ehrmanntraut, Rudiger et al.; "Airspace Design Process for Dynamic Sectorization"; 26th Digital Avionics Systems Conference (DASC), Dallas, Texas; pp. 1-8 (Oct. 21-25, 2007).

EP, Extended European Search Report; Patent Application No. 16168080.6 (dated Nov. 15, 2016).

* cited by examiner

SYSTEM AND METHOD FOR DETERMINING AN ALTERNATIVE FLIGHT ROUTE BASED ON SECTOR GEOMETRY

FIELD

The disclosed system relates to a flight routing system for an aircraft and, more particularly, to a flight routing system for determining an alternative route for an aircraft based on an airspace partitioned into a plurality of sectors.

BACKGROUND

Sometimes portions of an aircraft's flight route may become unavailable due to disruptions such as, for example, convective weather conditions or air traffic congestion. In the event a portion of the flight route becomes unavailable, an alternative route that avoids the blocked airspace needs to be determined. Specifically, the aircraft should be re-routed along the alternative route, and directed to the final destination as quickly and as effectively as possible.

Two known and commonly used approaches for determining the alternative route are re-routing on a waypoint based network and re-routing on a uniform grid based network. The waypoint based network approach may be a relatively simple way to determine the alternative route. However, the waypoint network, as historically defined, includes a limited set of waypoints, which in turn translates into a limited set of re-routing options for the aircraft. This in turn often results in a longer detour than necessary around the blocked airspace. Re-routing on a uniform grid network typically includes a network of connected points uniformly spaced throughout the airspace and is often based on the center or edge points of a grid of polygons, such as, for example, hexagons, rectangles, or triangles. Determining the alternative route based on the uniform grid network is often inefficient as well, depending on the granularity of the grid as well as the approach used to form connections between the points.

In addition to the above mentioned difficulties, a route determined based on the uniform grid network may also be inoperable, depending on how the path of the route aligns with the airspace sectors' geometries. Specifically, the aircraft may fly too closely to an edge of a sector, or may even cut a corner of a sector. This should be avoided because of the extra workload created for air traffic controllers when the aircraft flies too closely to an edge of a sector, or cuts a corner of a sector. Accordingly, there exists a need in the art for an improved approach for determining an alternative route for an aircraft.

SUMMARY

In one aspect, a flight routing system for determining an alternative route for an aircraft based on an airspace partitioned into a plurality of sectors, and an original flight route having an initial point of takeoff and a destination point is disclosed. The flight routing system includes a processor and a memory storing instructions executable by the processor to perform operations including determining a plurality of points within each of the plurality of sectors. The plurality of points are each located along an edge of one of the plurality of sectors. The processor also performs operations including determining at least one connecting arc for each sector, where the connecting arc connects a first point with another point located along one of the edges of each sector. The processor further performs operations for determining a complete time-based airspace network based on at least a forecast capacity, wherein the time-based forecast capacity indicates an available capacity for each sector, and which of the plurality of sectors are unavailable. The processor also performs operations for selecting the alternative route as output based on at least the complete time-based airspace network and the at least one connecting arc for each sector.

In another aspect, a computer-implemented method of determining an alternative route for an aircraft based on an airspace that is partitioned into a plurality of sectors and an original flight route having an initial point of takeoff and a destination point is disclosed. The method includes determining a plurality of points within each of the plurality of sectors by a processor, where the plurality of points are each located along an edge of one of the plurality of sectors. The method further includes determining at least one connecting arc for each sector by the processor. The connecting arc connects a first point with another point located along one of the edges of each sector. The method further includes determining a complete time-based airspace network based on at least a forecast capacity, wherein the time-based forecast capacity indicates an available capacity for each sector, and which of the plurality of sectors are unavailable. Finally, the method includes selecting the alternative route by the processor based on at least the complete time-based airspace network and the at least one connecting arc for each sector.

Other objects and advantages of the disclosed method and system will be apparent from the following description, the accompanying drawings and the appended claims.

DETAILED DESCRIPTION

Figure 1:
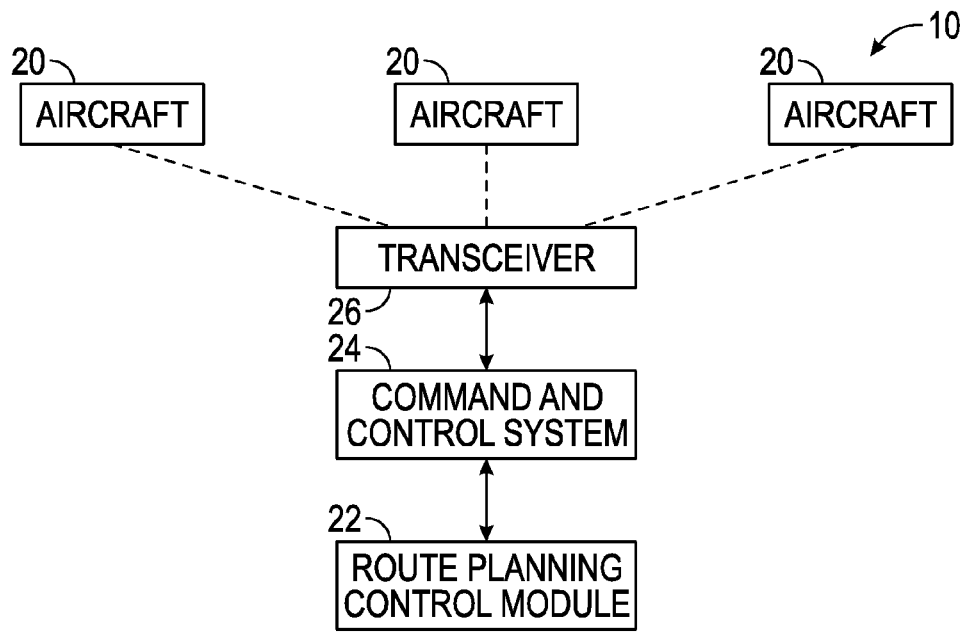
FIG. 1 is a block diagram of an exemplary flight routing system for establishing routing for one or more aircraft, where the flight routing system includes a route planning control module.

FIG. 1 is a block diagram illustrating an exemplary flight routing system 10 for establishing routing for one or more aircraft 20. The flight planning system 10 may include a route planning control module 22, a command and control system 24, and a transceiver 26. As explained in greater detail below, the flight planning system 10 may reroute one or more aircraft 20 in the event a portion of a specific aircraft's original flight route 30 (shown in FIG. 2) becomes unavailable due to disruptions. Some example of disruptions that may cause a portion of the original flight route 30 to become unavailable include, but are not limited to, convective weather conditions or air traffic congestion.

The command and control system 24 may send and receive information to and from each of the aircraft 20 through the transceiver 26. For example, the command and control system 24 may transmit updated routing information determined by the route planning control module 22 to one or more of the aircraft 20. The command and control system 24 may include one or more computers (not illustrated) that may be staffed by airline personnel. The command and control system 24 may be used to collect information relating to the various aircraft 20 such as, but not limited to, an initial point of takeoff or the current aircraft position, a destination point, aircraft type, the current position of the aircraft 20, weather conditions, air traffic control data, headings, altitudes, speed, originally planned flight route and fuel information. The information collected by the command and control system 24 may be shared with the route planning control module 22.

The route planning control module 22 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. As explained in greater detail below, the route planning control module 22 includes control logic for determining an alternative route 32 (shown in FIG. 2) for a specific aircraft 20 in the event a portion of the specific aircraft's flight route becomes unavailable based on a plurality of inputs from the command and control system 24.

The route planning control module 22 includes control logic for determining the alternative route 32 based on a network formed from a plurality of sector geometries. More specifically, the route planning control module 22 may determine the alternative route 32 based on an airspace 42 that is partitioned into a plurality of sectors 40 (illustrated in FIG. 2). One example of airspace 42 that may be partitioned into the sectors 40 is the National Airspace System (NAS), however it should be understood that the present disclosure should not be limited to a specific airspace and may work regardless of how the airspace 42 is partitioned into individual sectors or geometries.

Figure 2:
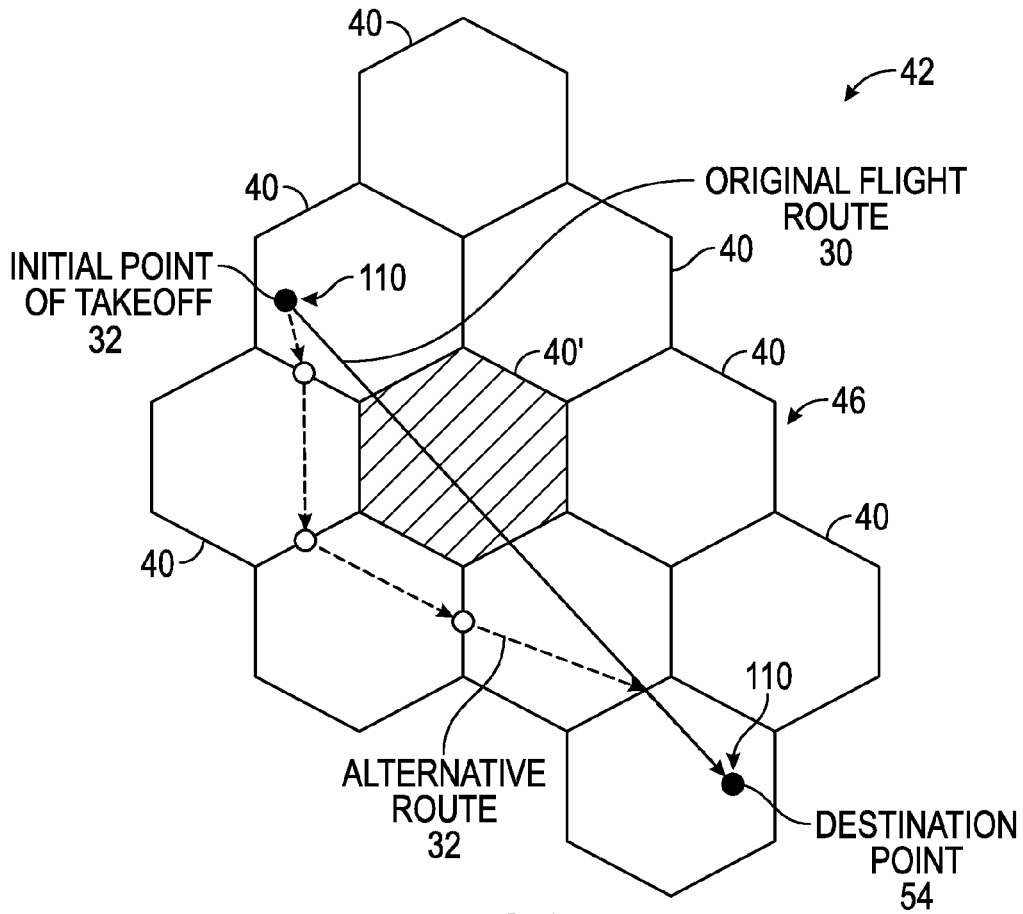
FIG. 2 is an exemplary illustration of an airspace including a plurality of uniformly shaped sectors.
Figure 3:
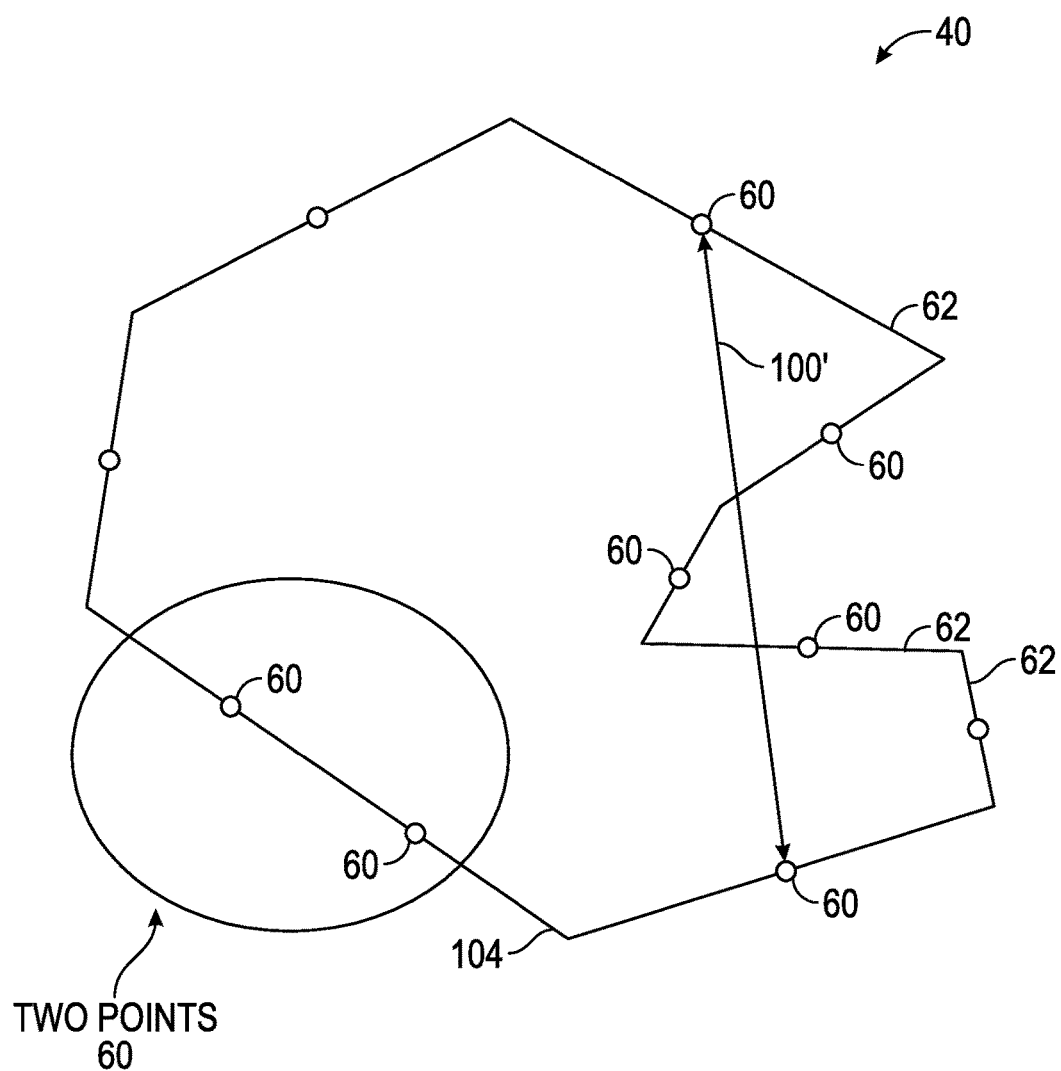
FIG. 3 is an exemplary illustration of a sector having an irregular shape.

Turning now to FIG. 2, an exemplary illustration of the airspace 42 is shown, where the sectors 40 each include a hexagonal shape. Specifically, in the embodiment as illustrated the sectors 40 may be part of a uniform grid network 46, where each sector 40 includes substantially identical hexagonal profiles. It is to be understood that while FIG. 2 illustrates hexagonally-shaped sectors, this illustration is merely exemplary in nature, and disclosure should not be limited to the illustrated example. Indeed, the sectors 40 may be any type of polygon having a closed shape including, but not limited to, a triangle or a rectangle. Moreover, as seen in the embodiment as shown in FIG. 3, the sectors 40 may even be irregularly shaped polygons. It should also be appreciated that in practice, the sectors 40 are usually based upon standard real world sector geometries, which reflect the primary flows of aircraft and traffic levels throughout the airspace 42.

Referring back to FIG. 2, it should also be understood that the sectors 40 do not need to be shaped identically, and the sectors 40 are merely illustrated in this manner for purposes of simplicity and clarity. Indeed, those of ordinary skill in the art will appreciate that each sector 40 may include its own unique shape and may be, for example, standard real sector geometries defined in the NAS or in other airspace regions. Moreover, it is also understood the sectors 40 may include geometry that is a reflection of the flow and density of the air traffic within the airspace 42, as in the NAS. For example, the sectors 40 may be shaped to align with the prevalent flow of air traffic, where smaller sectors 40 may be provided in areas with higher air traffic.

As seen in FIG. 2, the original flight route 30 of the aircraft 20 is depicted between an initial point of takeoff 52 and a destination point 54. The aircraft 20 may be diverted from the original flight route 30 and is rerouted to follow the alternative route 32. The alternative route 32 may eventually guide the aircraft 20 to its destination point 54. The route planning control module 22 (shown in FIG. 1) includes control logic for determining the alternative route 32 based on the geometry of the sectors 40. Specifically, the route planning control module 22 calculates or determines the alternative route 32 based on nodes or points 60 that are located along edges 62 of each individual sector 40 (FIG. 3).

Figure 4:
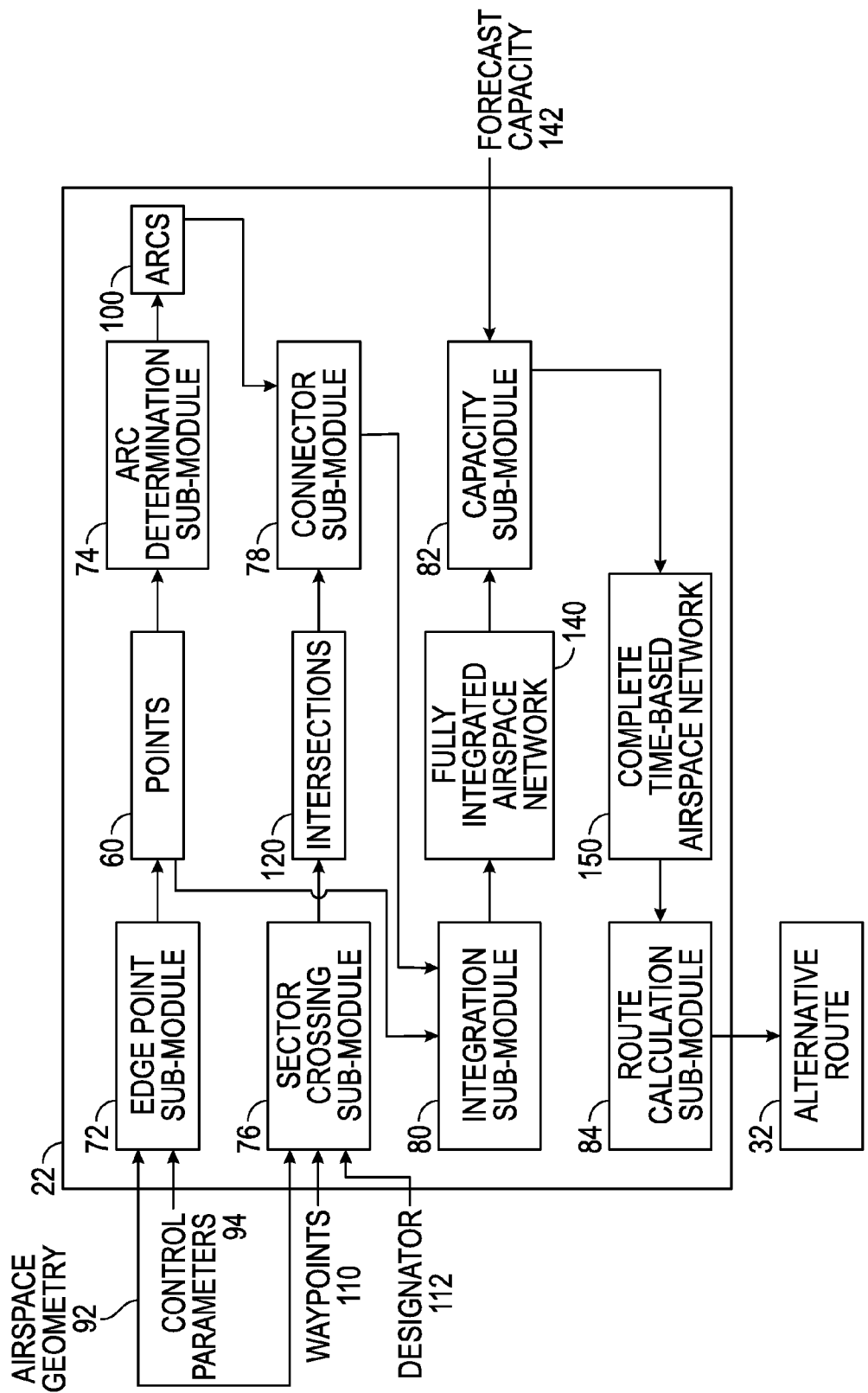
FIG. 4 is a block diagram of the route planning control module shown in FIG. 1.

FIG. 4 is a block diagram of the route planning control module 22. The route planning control module 22 may include plurality of sub-modules and control logic for determining the alternative route 32 (shown in FIG. 2). In the embodiment as shown in FIG. 4, the route planning control module 22 includes an edge point sub-module 72, an arc determination sub-module 74, a sector crossing sub-module 76, a connector sub-module 78, an integration sub-module 80, a capacity sub-module 82, and a route calculation sub-module 84.

Figure 5:
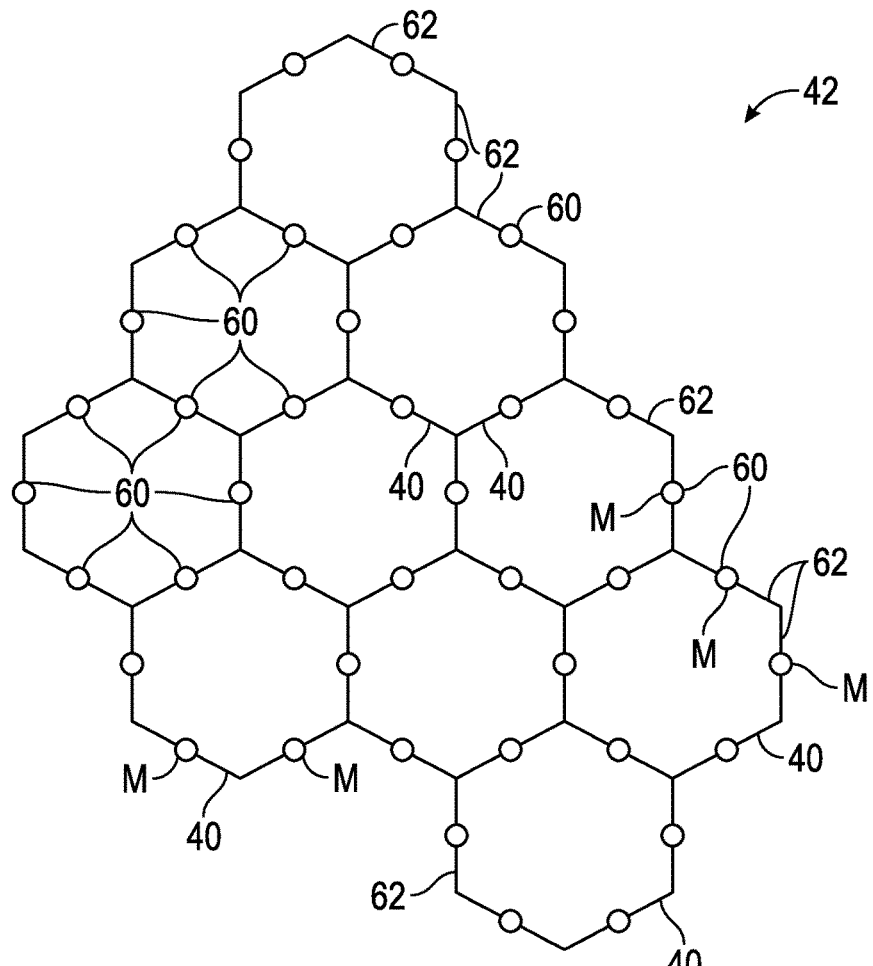
FIG. 5 is an exemplary illustration of the airspace in FIG. 2 where each edge of each sector includes a single point.

Referring to FIGS. 4 and 5, the edge point sub-module 72 of the route planning control module 22 receives as input airspace sector geometries 92 and control parameters 94, and determines a specific location of each point 60 located along the edges 62 of each individual sector 40. The airspace sector geometries 92 contain a description specifying the specific shape of all of the sectors 40 within the airspace 42. For example, in the embodiment as shown in FIG. 5, the airspace sector geometries 92 would describe the geometry of the sectors 40 as uniformly hexagonal. In one embodiment, the control parameters 94 include, but are not limited to, a maximum connecting angle $\theta_{max}$, a minimum number of points 60 located on each edge 62 of the sectors 40, and maximum distance measured between points 60 on the same edge 62 of the sectors 40 (if the edges 62 include more than one point 60).

The edge point sub-module 72 of the route planning control module 22 determines how many points 60 should be placed along each edge 62 of each sector 40 based on the control parameters 94, as well as the specific location of each point 60 for each sector 40. For example, in the embodiment as shown in FIG. 5, a single point 60 is located along each edge 62 of each sector 40, along a midpoint M of each edge 62. Although FIG. 5 illustrates a single point 60 located at each edge 62, it is to be understood that multiple points 60 may be located along a single edge 60 as well. For example, in the embodiment as shown in FIG. 3, a longer edge 104 of the sector 40 includes two points 60.

Figure 6:
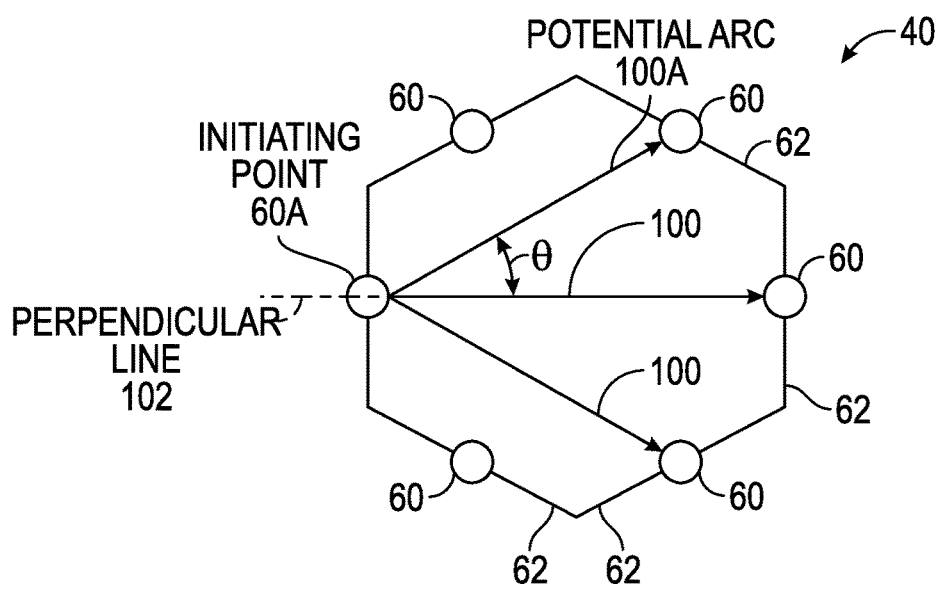
FIG. 6 is an illustration of a single sector seen in FIG. 5, where an arc is drawn between one of the points on an edge to another point on another edge of the sector.

The maximum connecting angle $\theta_{max}$ for each sector 40 used by the arc determination submodule 74 shall now be explained. The maximum connecting angle $\theta_{max}$ is indicative of a maximum angle that may be measured between two of the points 60 of a single sector 40, and is explained in greater detail below and illustrated in FIG. 6. Turning now to FIG. 6, an illustration of an exemplary sector 40 is shown. The sector 40 includes a single point 60 located along each edge 62. As seen in FIG. 6, a connecting arc 100 may be used to connect one of the points 60 with another point 60 located along another edge 62 of the sector 40. A connecting angle θ may be measured between a perpendicular line 102, which is perpendicular to the edge 62 of an initiating point 60A, and a potential connecting arc 100A. The connecting angle θ is the angle measured between the perpendicular line 102 and the potential arc 100A. For example, in the embodiment as shown in FIG. 6, the connecting angle θ for the potential arc 100A is about thirty degrees. If the connecting angle θ is less than the maximum connecting angle $\theta_{max}$, then the potential arc 100A may be included. However, it should be appreciated that any connecting arcs 100 that form a connecting angle θ greater than $\theta_{max}$ are not included as connecting arcs in forming the network. Thus, if the maximum connecting angle $\theta_{max}$ is set to forty degrees, then the points 60 that are located on edges 62 directly adjacent to another may not be connected to one another by one of the connecting arcs 100, since this would require the connecting arcs 100 to be positioned at an angle that is greater than forty degrees.

It is to be understood that an absolute value of a negative connecting angle may be used when comparing to the maximum connecting angle $\theta_{max}$. The maximum connecting angle $\theta_{max}$ may be based on factors such as, but not limited to, limitations of the specific aircraft performance, air traffic control, and the desired connectedness of the network in traversing one of the sectors 40. It should also be appreciated that if the maximum connecting angle $\theta_{max}$ is too large, then this may result in a route that cuts through the corner or a sector 40.

Figure 7:
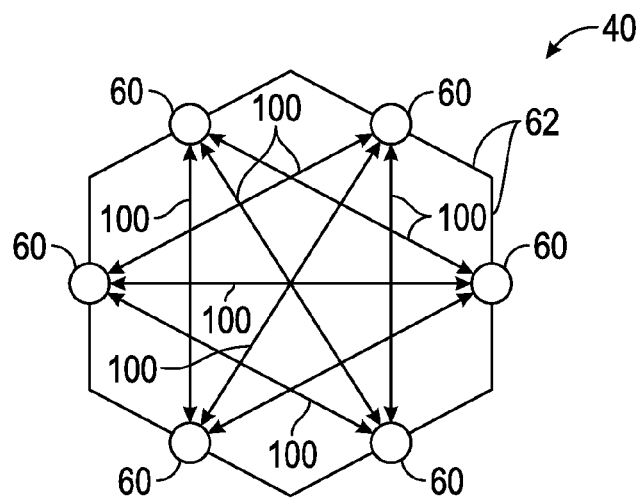
FIG. 7 is an illustration of the sector in FIG. 6, where all of the possible arcs are determined.
Figure 8:
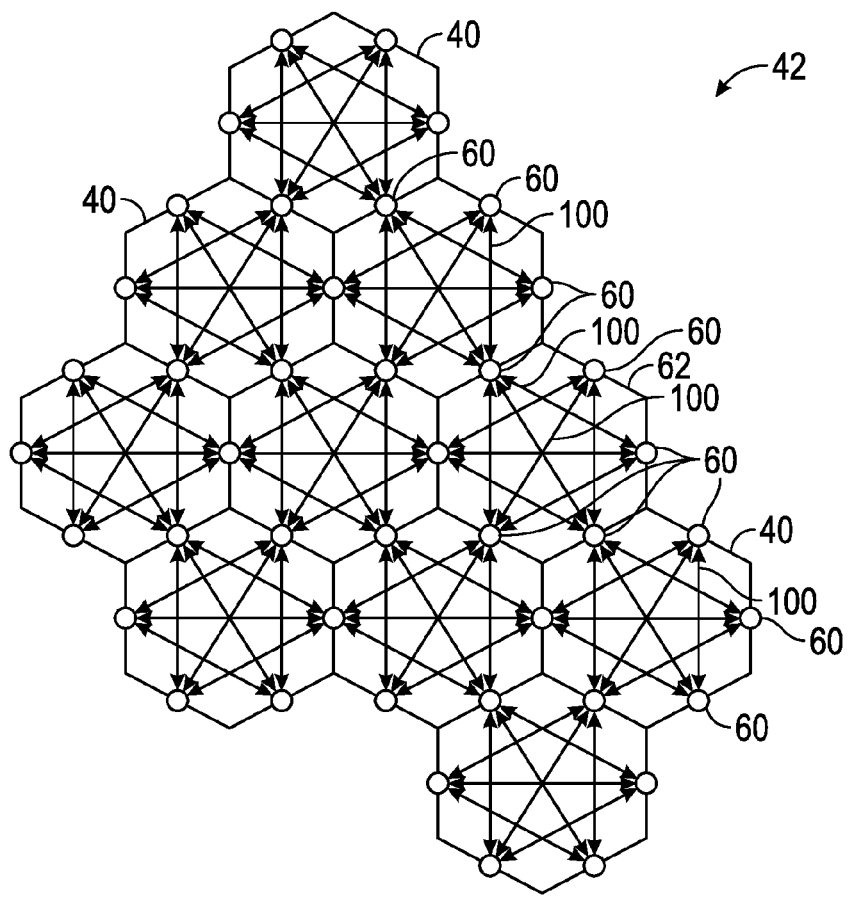
FIG. 8 is an illustration of the airspace in FIG. 5 where each arc crossing the sectors are determined.

Referring to FIGS. 4 and 7, the arc determination sub-module 74 of the route planning control module 22 receives as input the specific location of each of the points 60 located along the edges 62 of each individual sector 40 of the airspace 42 as determined by the edge point sub-module 72, and determines a set of connecting arcs 100 for each individual sector 40 based on the input. FIG. 7 illustrates a single sector 40, where each connecting arc 100 has been determined by the arc determination sub-module 74. As explained above, the points 60 located on edges 62 directly adjacent to another may not be connected to one another by one of the connecting arcs 100, since this would require the connecting arcs 100 to be positioned at an angle that is greater than the maximum connecting angle $\theta_{max}$ (which is forty degrees in the present example). As seen in FIG. 8, one of the points 60 of each sector 40 may be connected to at least one other point 60 along another edge 62 of the sector 40, and connecting arcs 100 formed from individual sectors 40 may connect to connecting arcs 100 located within adjacent sectors 40 to form a network of arcs through the entire airspace 42.

It is to be appreciated that if a specific connecting arc 100 is formed that falls outside the edges 62 of one of the sectors 40, then the specific connecting arc 100 may be eliminated. It should also be understood that since all of the sectors 40 shown in FIG. 8 are generally hexagonal, none of the connecting arcs 100 may fall outside of the edges 62. However, as seen in FIG. 3, the connecting arc 100' falls outside of the edges 62, and therefore would be eliminated.

Referring to FIGS. 2 and 4, the sector crossing sub-module 76 of the route planning control module 22 receives as input a set of waypoints 110 used to determine the original flight route 30, a designator 112 which indicates that rerouting of the original flight route 30 is required, and the airspace sector geometries 92. As seen in FIG. 2, the original flight route 30 is a planned flight route, and includes two waypoints 110 (e.g., the initial point of takeoff 52 and the destination point 54). The initial point of takeoff 52 may similarly be the current location of the aircraft 20 at the time the alternative route 32 is determined. In the embodiment as shown in FIG. 2, the original flight route 30 is assumed to be direct, and is shown as a straight line for purposes of simplicity and clarity, and therefore only requires two waypoints 110. However, those of ordinary skill in the art will readily appreciate that an aircraft's original flight route may not be straight, and may include more than two waypoints that are connected to one another. The designator 112 provides an indication that rerouting of the original flight route 30 is required because the original flight route 30 (shown in FIG. 2) is unavailable due to disruptions such as convective weather conditions or air traffic congestion.

Figure 9:
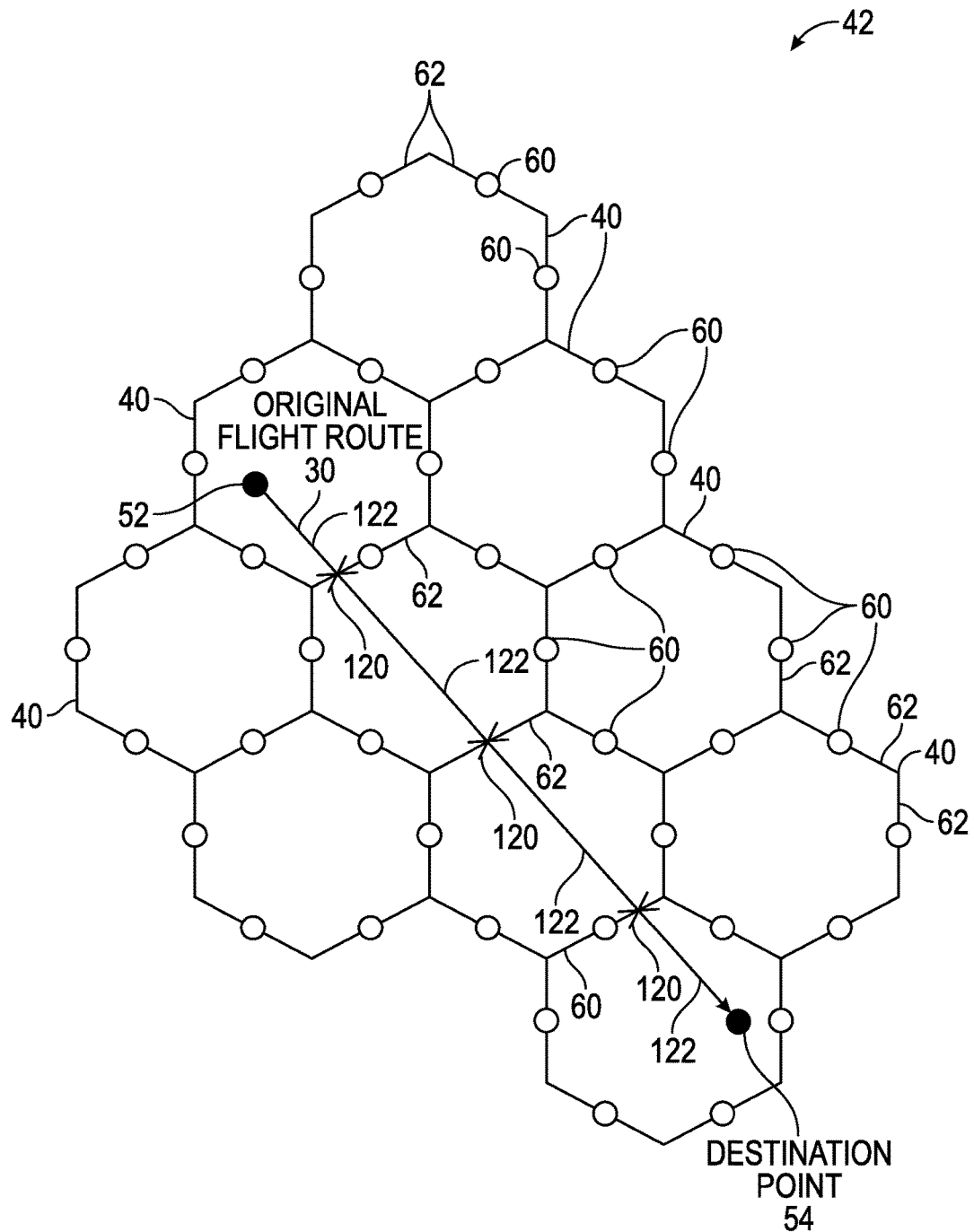
FIG. 9 is an illustration of the airspace shown in FIG. 5 where an original flight route intersects with edges of the sectors.

Referring to FIGS. 4 and 9, the sector crossing sub-module 76 of the route planning control module 22 determines all of the locations within the airspace 42 where the original flight route 30 intersects with the edges 62 of the sectors 40. As seen in FIG. 9, the exemplary original flight route 30 intersects with the edges 62 of the sectors 40 at three unique intersections 120, however it is to be appreciated that this illustration is merely exemplary in nature, and that any number of intersections may be determined based on the specific geometry of the original flight route 30. It is to be understood that while the original flight route 30 still appears the same, the original flight route 30 has actually been divided or partitioned into a series of four individual arcs 122. The arcs 122 are defined as segments between two of the intersections 120, or between one of the intersections and either the initial point of takeoff 52 of the destination point 54.

Figure 10:
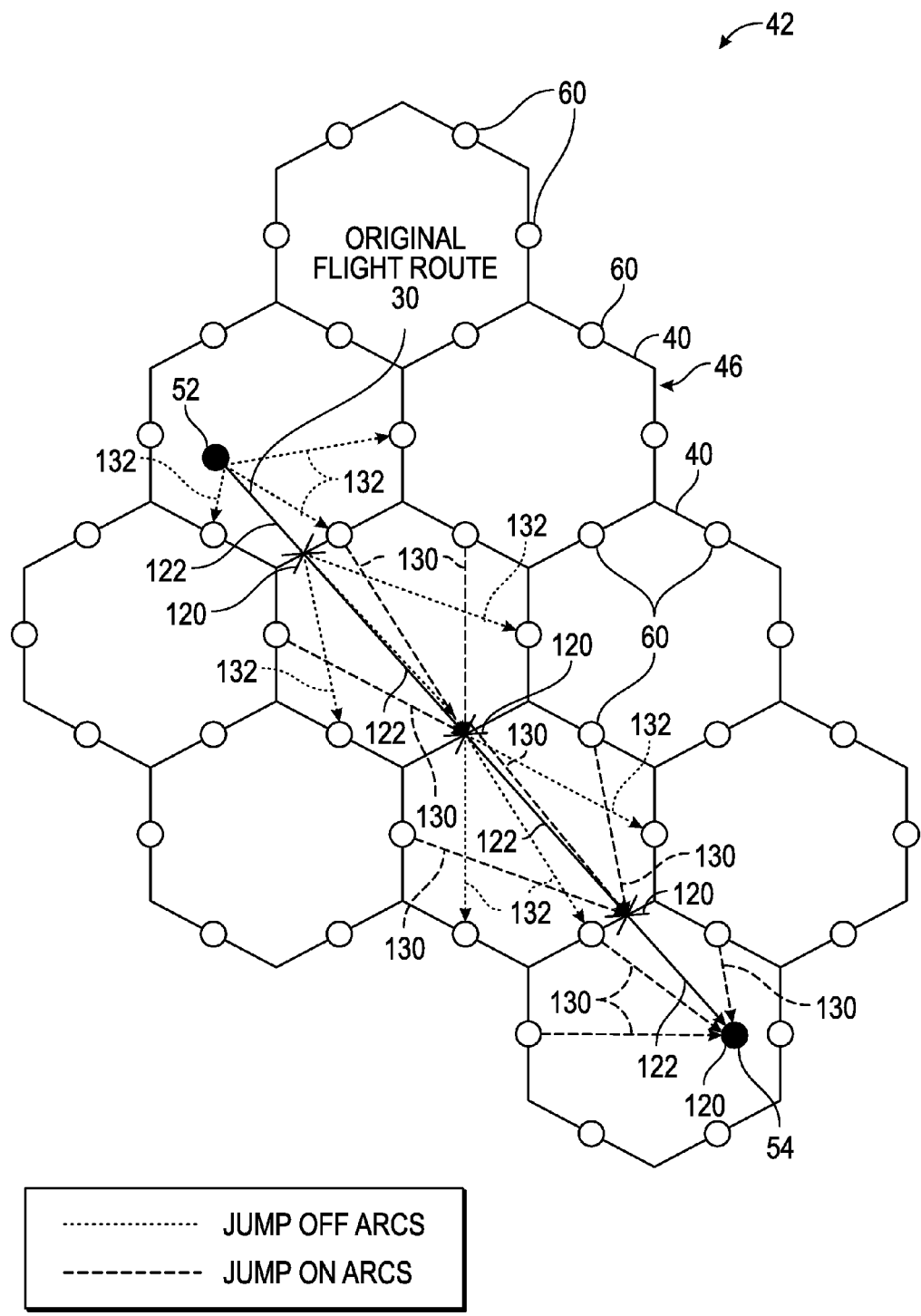
FIG. 10 is an illustration of the airspace shown in FIG. 9 including a set of jump off arcs as well as a set of jump on arcs.

Referring to FIGS. 4 and 10, the connector sub-module 78 of the route planning control module 22 receives as input the intersections 120 determined by the sector crossing sub-module 76, and the connecting arcs 100 for each sector 40 within the airspace 42 (FIG. 8) determined by the arc determination sub-module 74. The connector sub-module 78 then determines a set of jump on arcs 130 as well as a set of jump off arcs 132 based on the input. As seen in FIG. 10, the jumping on arcs 130 connect one of the points 60 of one of the sectors 40 of the uniform grid network 46 to one of the intersections 120, or the destination point 54 (i.e., the arc jumps onto the original flight route 30). The jumping off arcs 132 represent where one of the intersections 120 or the initial point of takeoff 52 connects to one of the points 60 of one of the sectors 40 of the uniform grid network 46 (i.e., the arc jumps off the original flight route 30).

Figure 11:
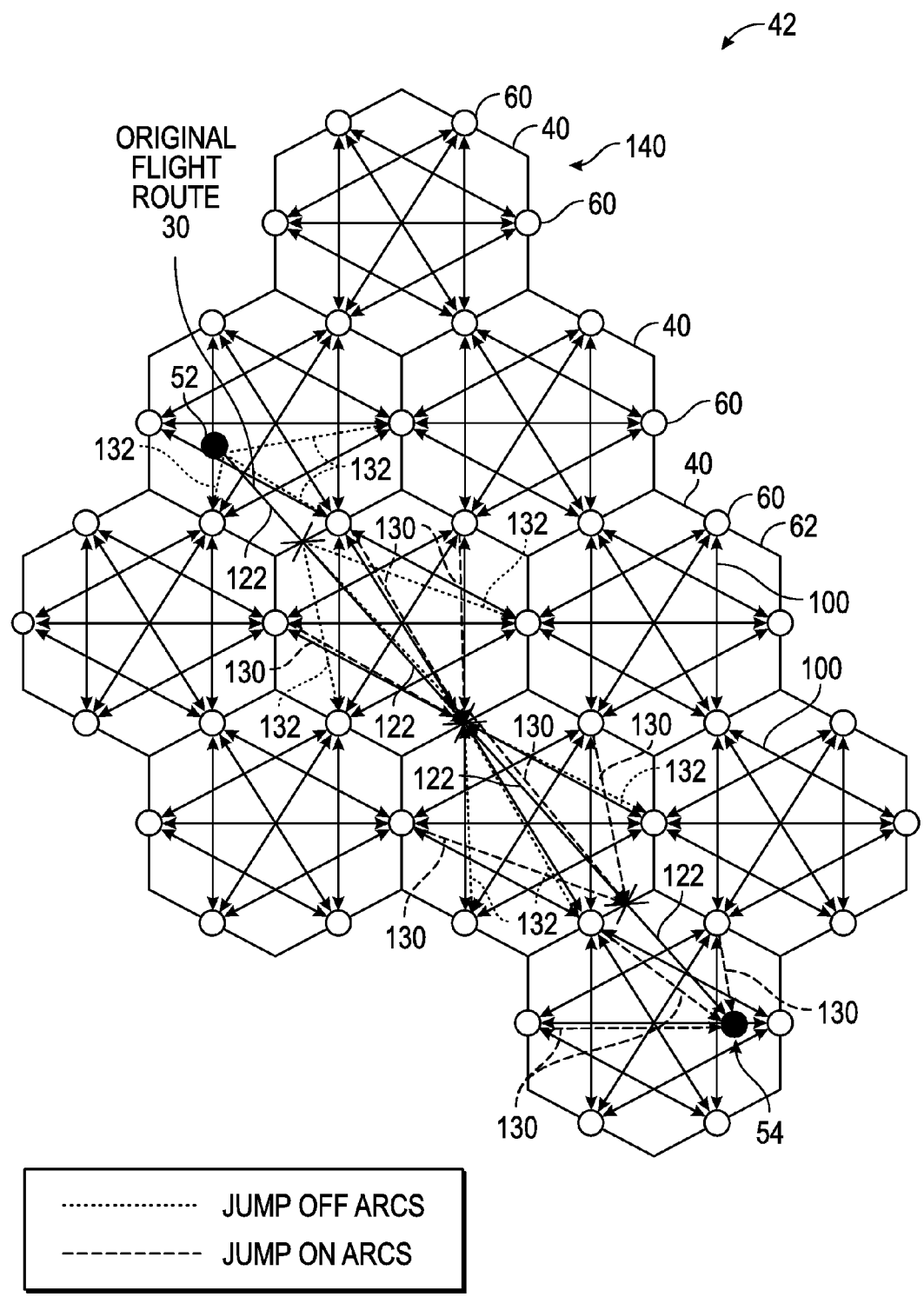
FIG. 11 is illustration of a fully integrated airspace, including the original flight route, the set of jump off arcs, and the set of jump on arcs.

Referring to FIGS. 4 and 11, the integration sub-module 80 of the route planning control module 22 receives as input the specific location of each of the points 60 located along the edges 62 of each individual sector 40 of the airspace 42, the set of connecting arcs 100 for each individual sector 40, the intersections 120, four individual arcs 122, the set of jump on arcs 130, and set of jump off arcs 132. The integration sub-module 80 may then combine all of the inputs together to create a fully integrated airspace network 140, which is seen in FIG. 11, and provides multiple pathways over which the aircraft 20 may traverse the airspace 42.

The capacity sub-module 82 of the route planning control module 22 receives as input a sector forecast capacity 142, as well as the fully integrated airspace network 140 as seen in FIG. 11. The sector forecast capacity 142 indicates a forecast of the available capacity for each sector 40 (i.e., a measure of how many aircraft may simultaneously be within in a sector 40), and also indicates which sector 40 or sectors 40 may be unavailable or have limited availability due to conditions such as, for example, convective weather conditions or air traffic congestion. The air traffic congestion may be referred to as restricted airspace. It is to be appreciated that the sector forecast capacity 142 is time-based, which means that the available capacity as well as the availability of a specific sector 40 may change as time progresses. Specifically, if there is a convective weather condition contained in one of the sectors 40 that make the sector unavailable, eventually the weather conditions will improve. Thus, the sector 40 will eventually become available again.

Figure 12:
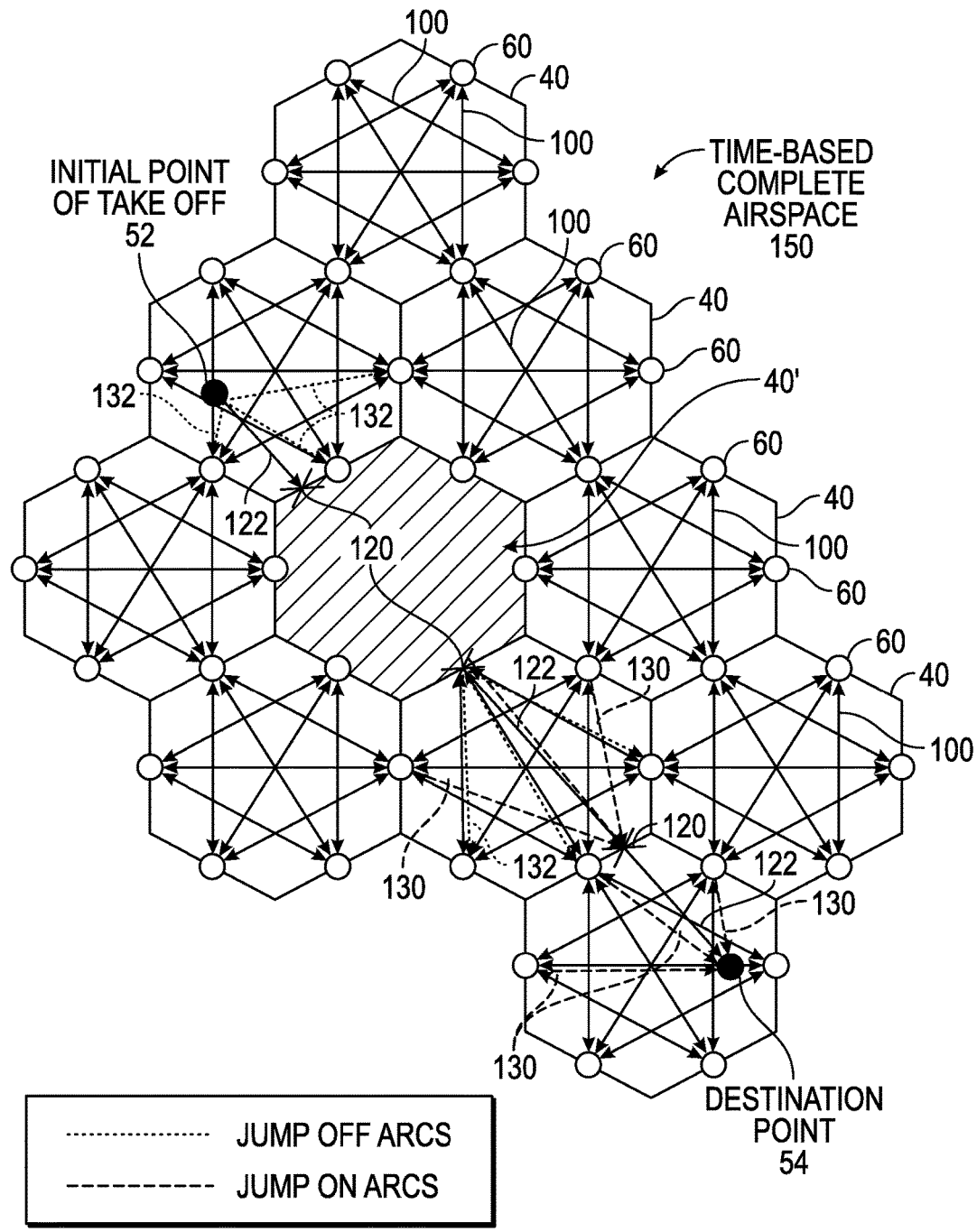
FIG. 12 is an illustration of a complete airspace, where a sector that is unavailable has been omitted.

For example, in the embodiment as shown in FIG. 2 a specific sector 40' is shaded as an unavailable sector. The unavailable sector 40' is representative of unavailable airspace. Thus, the aircraft 20 is unable to fly through the specific sector 40', at least during the time the aircraft 20 would traverse the specific sector 40' to reach the destination point 54. Accordingly, the capacity sub-module 82 of the route planning control module 22 may then turn off or make all of the connecting arcs 100 located within the specific sector 40' from the integrated airspace 140 unavailable, thereby creating a complete time-based airspace network 150, which is shown in FIG. 12. As seen in FIG. 12, the complete time-based airspace network 150, which includes any arcs located within the specific sector 40' turned off. Thus, as can be seen in FIG. 12, the complete time-based airspace network 150 includes all of the arcs (e.g., the connecting arcs 100, the arcs 122, the jump on arcs 130, and the jump off arcs 132). The route planning control module 22 may now determine a valid, complete rerouting option for the aircraft 20 based on the complete time-based airspace network 150.

It is to be understood that because the complete time-based airspace network 150 is time-based, the illustration of the complete time-based airspace network 150 may change as time progresses. Specifically, the arcs included within the complete time-based airspace network 150 may change over time, where specific sectors 40 and their associated arcs may become available or unavailable for periods of time. Thus, it is important to determine the availability of each sector 40 within the complete time-based airspace network 150 based on a specific path through the complete time-based airspace network 150 and the estimated time when the aircraft would traverse a given sector 40.

Turning back to FIG. 4, the route calculation sub-module 84 of the route planning control module 22 receives as input the complete time-based airspace network 150 as determined by the forecast capacity sub-module 82. The route calculation sub-module may then determine the shortest potential route between the initial point of takeoff 52 and the destination point 54. Referring to both FIGS. 4 and 12, the shortest potential route may be calculated based on all of the arcs within the complete time-based airspace network 150, which include the connecting arcs 100, the arcs 122, the jump on arcs 130, and the jump off arcs 132. The route calculation sub-module 84 may then output the shortest route in terms of distance, which is the alternative route 32 as illustrated in FIG. 2.

Referring generally to the figures, the disclosed flight routing system 10 provides numerous benefits and advantages when compared to the existing flight routing systems that are currently available. Specifically, the disclosed flight routing system 10 includes a higher resolution network compared to a waypoint based network, therefore reducing the length of detours around blocked sectors, which in turn reduces the fuel consumption of an aircraft. Moreover, the disclosed flight routing system 10 is also flexible, since the number of points located along each edge of each sector and the maximum connecting angle $\theta_{max}$ (seen in FIG. 6) are both variable. Thus, the resolution of the sector network, even by individual sectors, may be controlled. Moreover, it is to be understood that even though the figures illustrated hexagonal sectors for simplicity and clarity, real airspace sector geometries may be used in practice, which reflect the primary traffic flow and density of the air traffic. Thus, the sectors may be shaped to align with the prevalent flow of air traffic and reflect the air traffic density. Therefore, smaller sectors may be provided in areas with higher air traffic, which results in sectors that are aligned with the flow of air traffic. Using sector geometries based on air traffic and density may result in reroute options that are more likely to be operationally favorable.

Figure 13:
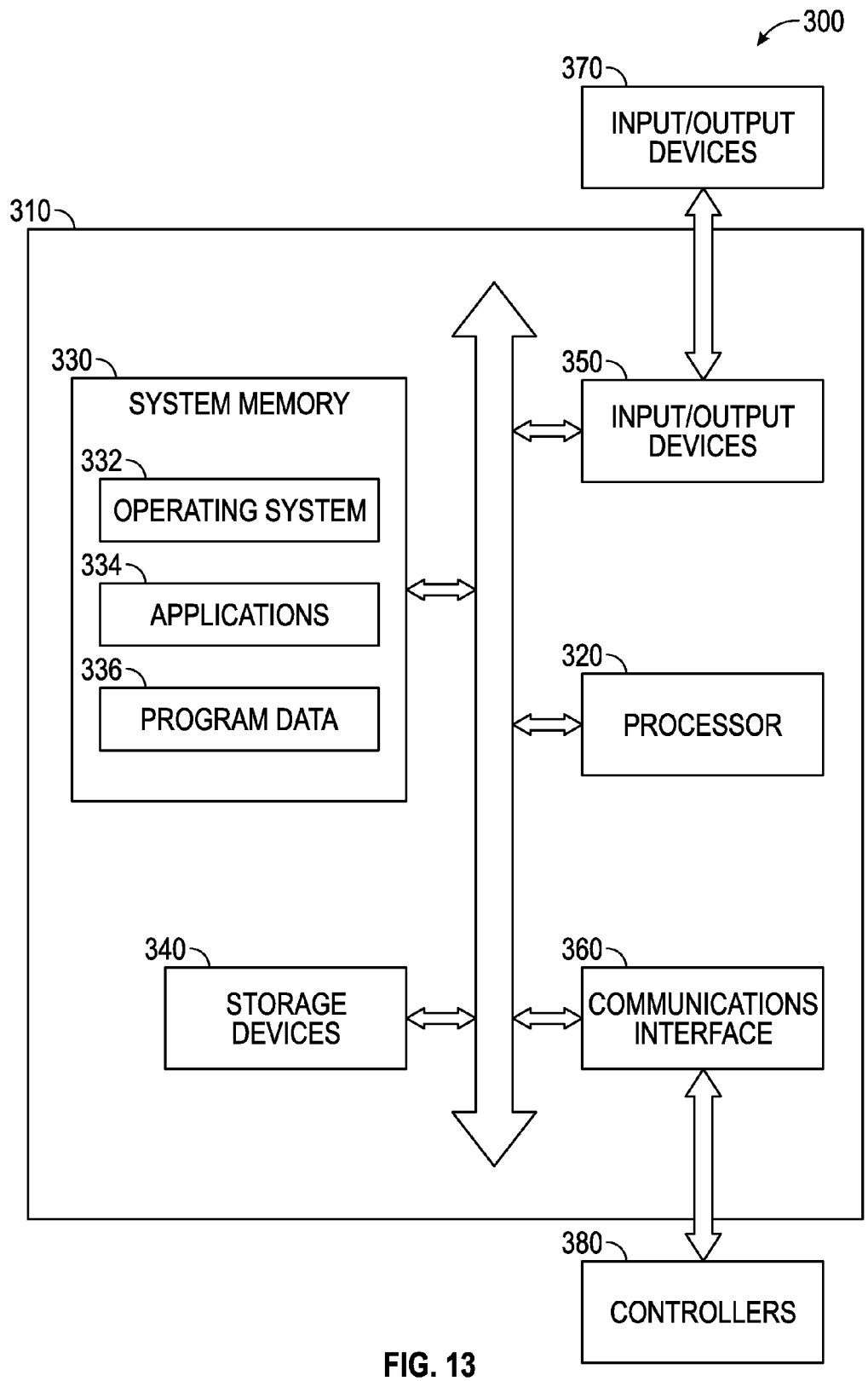
FIG. 13 is an illustration of a block diagram of an exemplary computing environment including a general purpose computing device for supporting embodiments of the present disclosure.

FIG. 13 is an illustration of a block diagram of a computing environment 300 including a general purpose computing device 310 for supporting embodiments of computer-implemented methods and computer-executable program instructions (or code) according to the present disclosure. For example, the computing device 310, or portions thereof, may execute instructions to adaptively encode/decode data in a particular number of bits. The computing device 310, or portions thereof, may further execute instructions according to any of the methods described herein.

The computing device 310 may include a processor 320. The processor 320 may communicate with a system memory 330, one or more storage devices 340, one or more input/output interfaces 350, one or more communications interfaces 360, or a combination thereof. The system memory 330 may include volatile memory devices (e.g., random access memory (RAM) devices), nonvolatile memory devices (e.g., read-only memory (ROM) devices, programmable read-only memory, and flash memory), or both. The system memory 330 may include an operating system 332, which may include a basic/input output system for booting the computing device 310 as well as a full operating system to enable the computing device 310 to interact with users, other programs, and other devices.

The system memory 330 may include one or more computer programs or applications 334 which may be executable by the processor 320. For example, the applications 334 may include instructions executable by the processor 320 to determine the alternative route 32 (FIG. 2). The system memory 330 may include program data 336 usable for controlling the analysis of data. The applications 334 may also be embodied in a computer readable medium having the applications 334 stored therein.

The processor 320 may also communicate with one or more storage devices 340. For example, the one or more storage devices 340 may include nonvolatile storage devices, such as magnetic disks, optical disks, or flash memory devices. The storage devices 340 may include both removable and non-removable memory devices. The storage devices 340 may be configured to store an operating system, images of operating systems, applications, and program data. In a particular embodiment, the memory 330, the storage devices 340, or both, include tangible computer-readable media.

The processor 320 may also communicate with one or more input/output interfaces 350 that enable the computing device 310 to communicate with one or more input/output devices 370 to facilitate user interaction. The input/output interfaces 350 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 370 may include keyboards, pointing devices, displays, speakers, microphones, touch screens, and other devices. The processor 320 may detect interaction events based on user input received via the input/output interfaces 350. Additionally, the processor 320 may send a display to a display device via the input/output interfaces 350.

The processor 320 may communicate with devices or controllers 380 via the one or more communications interfaces 360. The one or more communications interfaces 360 may include wired Ethernet interfaces, IEEE 802 wireless interfaces, other wireless communication interfaces, or other network interfaces. The devices or controllers 380 may include host computers, servers, workstations, and other computing devices.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A flight routing system for determining an alternative route for an aircraft based on an airspace that is partitioned into a plurality of sectors and an original flight route, wherein the original flight route has an initial point of takeoff and a destination point, the flight routing system comprising:
   a processor that receives as input a maximum connecting angle measured between a perpendicular line at a specific point on a selected edge of a selected sector and at least one connecting arc; and
   a memory storing instructions executable by the processor to perform operations comprising:
      determining a plurality of points within each of the plurality of sectors, wherein the plurality of points are each located along an edge of one of the plurality of sectors;
      determining the at least one connecting arc for each of the plurality of sectors, wherein the at least one connecting arc connects a first point with another point located along one of the edges of each of the plurality of sectors such that an angle measured between the first point and the another point located along one of the edges is less than the maximum connecting angle;
      determining a complete time-based airspace network based on at least a forecast capacity, wherein the forecast capacity indicates an available capacity for each of the plurality of sectors and which of the plurality of sectors are unavailable, and wherein the maximum connecting angle is based on at least one of aircraft performance, air traffic control, and an amount of connectivity of the time-based airspace network within a single sector; and
      selecting the alternative route as output based on at least the complete time-based airspace network and the at least one connecting arc for each of the plurality of sectors, wherein the processor determines the alternative route without any of the at least one connecting arcs located within an unavailable sector, and wherein the unavailable sector is representative of unavailable airspace.

2. The flight routing system of claim 1, wherein the processor performs an operation to determine a plurality of intersections, wherein each of the plurality of intersections represent where the edge of one of the plurality of sectors and the original flight route intersect.

3. The flight routing system of claim 2, wherein the processor performs an operation to partition the original flight route into a series of individual arcs based on the plurality of intersections.

4. The flight routing system of claim 2, wherein the processor performs an operation to determine at least one jump on arc based on either the destination point or one of the plurality of intersections, wherein the at least one jumping on arc connects the one of the plurality of points to either one of the plurality of intersections or the destination point.

5. The flight routing system of claim 2, wherein the processor performs an operation to determine at least one jump off arc based on either the one of the plurality of intersections of the initial point of takeoff, wherein the at least one jump off arc connects one of the plurality of points to either one of the plurality of intersections or the initial point of takeoff.

6. The flight routing system of claim 1, wherein the available capacity is based on a number of aircraft that are simultaneously located within a single sector.

7. The flight routing system of claim 1, wherein the forecast capacity is based on at least one of convective weather conditions, air traffic congestion, and restricted airspace.

8. The flight routing system of claim 1, wherein the plurality of sectors each include a unique shape that is a reflection of a flow and density of air traffic within the airspace.

9. A computer-implemented method of determining an alternative route for an aircraft based on an airspace that is partitioned into a plurality of sectors and an original flight route having an initial point of takeoff and a destination point, the method comprising:
   receiving as input, by a processor, a maximum connecting angle measured between a perpendicular line at a specific point on a selected edge of a selected sector and at least one connecting arc;
   determining a plurality of points within each of the plurality of sectors by the processor, wherein the plurality of points are each located along an edge of one of the plurality of sectors such that an angle measured between the first point and the another point located along one of the edges is less than the maximum connecting angle;
   determining at least one connecting arc for each of the plurality of sectors by the processor, wherein the at least one connecting arc connects a first point with another point located along one of the edges of each of the plurality of sectors;
   determining a complete time-based airspace network based on at least a forecast capacity, wherein the forecast capacity indicates an available capacity for each of the plurality of sectors, and which of the plurality of sectors are unavailable, and wherein the maximum connecting angle is based on at least one of aircraft performance, air traffic control, and an amount of connectively of the time-based airspace network within a single sector; and selecting the alternative route by the processor based on at least the complete time-based airspace network and the at least one connecting arc for each of the plurality of sectors, wherein the processor determines the alternative route without any of the at least one connecting arcs located within an unavailable sector, and wherein the unavailable sector is representative of unavailable airspace.

10. The method of claim 9, wherein the processor determines a plurality of intersections, wherein each of the plurality of intersections represent where the edge of one of the plurality of sectors and the original flight route intersect.

11. The method of claim 10, wherein the processor partitions the original flight route into a series of individual arcs based on the plurality of intersections.

12. The method of claim 10, wherein the processor determines at least one jump on arc based on either the destination point or one of the plurality of intersections, wherein the at least one jumping on arc connects the one of the plurality of points to either one of the plurality of intersections or the destination point.

13. The method of claim 10, wherein the processor determines at least one jump off arc based on either the one of the plurality of intersections of the initial point of takeoff, wherein the at least one jump off arc connects one of the plurality of points to either one of the plurality of intersections or the initial point of takeoff.

14. The method of claim 10, wherein the available capacity is based on a number of aircraft that are simultaneously located within a single sector.

15. The method of claim 14, wherein the forecast capacity is based on at least one of convective weather conditions, air traffic congestion and restricted airspace.

16. The method of claim 10, wherein the plurality of sectors each include a unique shape that is a reflection of a flow and density of air traffic within the airspace.

* * * * *